United States Patent
Ayalur et al.

(10) Patent No.: US 9,042,887 B2
(45) Date of Patent: May 26, 2015

(54) METHOD FOR IMPROVING DISCOVERY OF PREFERRED MOBILE COMPUTING LOCATIONS

(71) Applicant: GOOGLE TECHNOLOGY HOLDINGS LLC, Mountain View, CA (US)

(72) Inventors: Venkateswaran S. Ayalur, Lindenhurst, IL (US); William F. Taranowski, Libertyville, IL (US); Haijin Yan, Hainesville, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

(21) Appl. No.: 13/965,711

(22) Filed: Aug. 13, 2013

(65) Prior Publication Data

US 2013/0331123 A1 Dec. 12, 2013

Related U.S. Application Data

(62) Division of application No. 13/118,910, filed on May 31, 2011, now abandoned.

(51) Int. Cl.
*H04W 4/00* (2009.01)
*H04W 24/00* (2009.01)
(Continued)

(52) U.S. Cl.
CPC ............. *H04W 64/00* (2013.01); *G01S 5/0252* (2013.01); *H04W 48/16* (2013.01)

(58) Field of Classification Search
CPC ..... G05S 5/0252; H04W 48/16; H04W 64/00

USPC .................... 455/435.1, 456.1, 436
See application file for complete search history.

(56) References Cited

U.S. PATENT DOCUMENTS 6,427,077 B1 7/2002 Alberth, Jr. et al.
6,438,381 B1 8/2002 Alberth, Jr. et al.
(Continued)

FOREIGN PATENT DOCUMENTS

EP 1863313 B1 2/2014
WO 2009049924 A2 4/2009

OTHER PUBLICATIONS

"U.S. Non-Final OA dtd Feb. 13, 2013", United States Patent & Trademark Office, "Non-Final Rejection" for Patent Application No. 13/118,910 dated Feb. 13, 2013, 9 pages.
(Continued)

*Primary Examiner* — Opiribo Georgewill
(74) *Attorney, Agent, or Firm* — Morris & Kamlay LLP

(57) ABSTRACT

A method for improving discovery of preferred mobile computing locations includes monitoring sensor data corresponding to a mobile computing device (MCD) and monitoring non-GPS network data implemented by the mobile computing device. Additionally, the method determines whether sensor data and non-GPS network data indicate that the mobile computing device is stationary within a cell site as well as scanning any network that the mobile computing device is electronically linked to. In short, the method discovers an improved preferred mobile computing location based on the sensor data and non-GPS network data that provide reliable information that the mobile computing device is stationary within the cell site. The sensor data and non-GPS network data are converged when several corresponding scans produce overlapping results.

11 Claims, 5 Drawing Sheets

(51) Int. Cl.
  *H04W 36/00*   (2009.01)
  *H04W 64/00*   (2009.01)
  *G01S 5/02*    (2010.01)
  *H04W 48/16*   (2009.01)

(56) References Cited

U.S. PATENT DOCUMENTS

| | | |
|---|---|---|
| 7,392,056 B2 | 6/2008 | Corson et al. |
| 7,755,517 B2 | 7/2010 | Sarin et al. |
| 2002/0119788 A1 | 8/2002 | Parupudi et al. |
| 2004/0120278 A1 | 6/2004 | Krantz et al. |
| 2004/0192269 A1 | 9/2004 | Hill |
| 2007/0008941 A1 | 1/2007 | Narasimha et al. |
| 2009/0005972 A1 | 1/2009 | de Koning et al. |
| 2009/0098880 A1 | 4/2009 | Lindquist |
| 2010/0004997 A1 | 1/2010 | Mehta et al. |
| 2011/0034179 A1 | 2/2011 | David et al. |
| 2011/0159884 A1 | 6/2011 | Chawla |
| 2011/0195714 A1* | 8/2011 | Sawinathan ............... 455/435.1 |
| 2012/0289186 A1 | 11/2012 | Ayalur |
| 2012/0309430 A1 | 12/2012 | Ayalur et al. |
| 2012/0322460 A1 | 12/2012 | Liu et al. |
| 2013/0331122 A1 | 12/2013 | AYALUR et al. |

OTHER PUBLICATIONS

"U.S. Non-Final OA dtd Mar. 1, 2013", United States Patent & Trademark Office, "Non-Final Rejection" for Patent Application No. 131103,377 dated Mar. 1, 2013, 13 pages.

"U.S. Non-Final OA dtd Apr. 24, 2014", United States Patent & Trademark Office, "Non-Final Rejection" for Patent Application No. 131965,711 dated Apr. 24, 2014, 7 pages.

"U.S. Notice of Allowance & Fees Due dated Mar. 18, 2014", United States Patent & Trademark Office, "Notice of Allowance and Fee(s) Due" for Patent Application No. 13/965,663 dated Mar. 18, 2014, 11 pages.

* cited by examiner

| ACTIVITIES | TIMES, TRANSITIONS, APP USAGE, CALL/SMS .... |
| --- | --- |
| NETWORK | TYPES, CELL ID, RSSI, SIGNAL QUALITY .... |
| PERIPHERALS | WIFI, BT, DLNA, DOCKS, CHARGERS .... |
| WHO | NAME OF BUSINESS / HOME, WHO I INTERACTED WITH .... |

# METHOD FOR IMPROVING DISCOVERY OF PREFERRED MOBILE COMPUTING LOCATIONS

CROSS REFERENCE TO RELATED APPLICATIONS

The present application is a divisional of U.S. patent application Ser. No. 13/118,910, entitled "A Method for Improving Discovery of Preferred Mobile Computing Locations", filed May 31, 2011, which is related to U.S. patent application Ser. No. 13/103,377, filed May 9, 2011, and whose contents are incorporated by reference in their entirety.

FIELD OF INVENTION

This invention is directed to mobile computing devices and their users. More specifically, the invention is directed to enabling the mobile computing device to more closely align with a particular user's preferences.

BACKGROUND

There is great interest in adjusting behavior of a mobile computing device (MCD) to suit or benefit the user of the MCD according to that user's personal taste. For example, the behavior of a MCD can be modified by adjusting associated ringers or ringtones, turning on its Wi-Fi communication in one location versus another location (e.g., home versus work locations), as well as affecting accompanying Bluetooth and GPS operation. All of these adjustments are usually done manually by the user and must be remembered to do so.

Some solutions involve collecting locations based on GPS locations. However, GPS locations may not always be available, especially inside a building. Additionally, using GPS places a significant power drain on the battery of a MCD.

DETAILED DESCRIPTION

Figure 1:
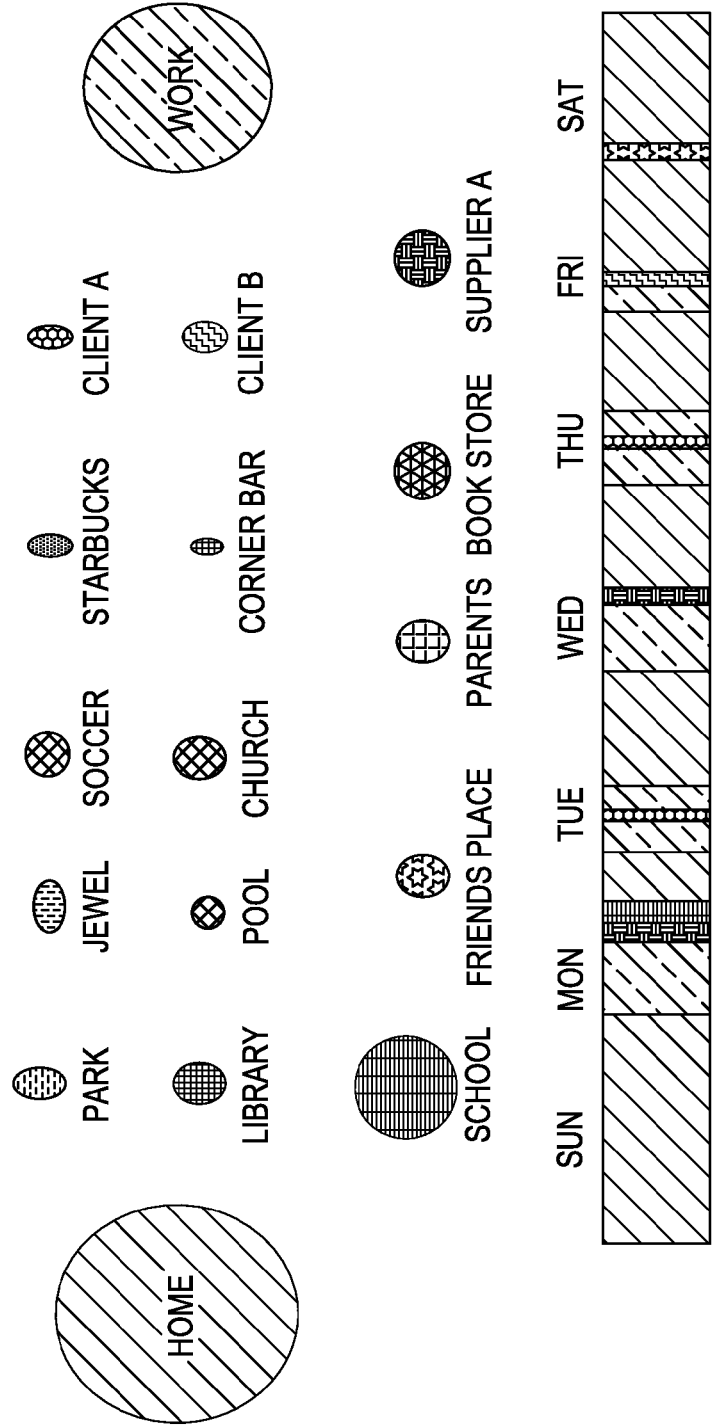
FIG. 1 illustrates a plurality of meaningful locations to an exemplary user of a MCD.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and device components related to associating objects in an electronic device. Accordingly, the device components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the method, or device that comprises the element. Also, throughout this specification the term "key" has the broad meaning of any key, button or actuator having a dedicated, variable or programmable function that is actuated by a user.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions, and the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

A method for discovering preferred mobile computing locations includes monitoring amount of time a mobile computing device is located within a cell tower region; and monitoring amount of time a mobile computing device is located within a Wi-Fi region. Afterwards, the method collects mobile computing device location data corresponding to the monitoring of cell tower region and Wi-Fi region; and analyzes the mobile computing device location data to determine amount of time and frequency of visits that the mobile computing device is in the cell tower and Wi-Fi regions. The above steps can be controlled via a processor within the mobile computing device such that a preferred mobile computing location is discovered for a user of the mobile computing device. Cell ID and Wi-Fi network ID are employed herein and are described by way of example, however, it is also contemplated that physical sensors associated with the MCD may also be monitored to determine meaningful locations of the user. For example, infrared sensors, integrated Bluetooth systems, retina-scanning devices, and fingerprint devices. Just as important can be certain characteristics about the mobile computing device itself. For example, usage characteristics (e.g., phone calls, emails, text, game playing, remaining battery level, etc.) and mobile computing application selections at certain locations versus different usage characteristics and application selections at other locations. Consequently, meaningful or preferred locations can be determined without using battery draining geographical location technology, such as global positioning system (GPS), or Global Navigation Satellite System (GLONASS), or Beidou Satellite Navigation System.

An exemplary MCD can operate under a set of programmable instructions. A set of instructions, when executed, may cause the MCD to perform any one or more of the methodologies described herein. In some embodiments, the MCD operates as a standalone device. In some embodiments, the MCD may be connected (e.g., using a network) to other MCDs. In a networked deployment, the MCD may operate in the capacity of a server or a client user MCD in a server-client user network environment, or as a peer machine in server-client user network environment, or as a peer machine in a peer-to-peer (or distributed) network environment.

The MCD may comprise a server computer, a client user computer, a personal computer (PC), a tablet PC, a personal digital assistant, a portable phone on a wireless or cellular network, a laptop computer, a smartphone either alone or combined with a display device, a control system, a network router, or any machine capable of executing a set of instructions (sequential or otherwise) that specify actions to be taken by that machine, not to mention a mobile server. It will be understood by those ordinarily skilled in the art of mobile computing and communication devices and associated networks, either wired or wireless that the mobile computing device described herein includes broadly any electronic device that provides voice, video, and data communication. Further, while a single MCD may be illustrated, the term "mobile computing device" shall also be taken to include any collection of mobile computing devices that individually or jointly executed a set (or multiple sets) of instructions to perform any one or more methodologies discussed herein.

An exemplary method for improving discovery of preferred mobile computing locations can include monitoring sensor data corresponding to a mobile computing device (MCD) and monitoring non-GPS network data implemented by the mobile computing device. Additionally, the exemplary method determines whether sensor data and non-GPS network data indicate that the mobile computing device is stationary within a cell site and scans any network that the mobile computing device is electronically linked to. In short, the method discovers an improved preferred mobile computing location based on the sensor data and non-GPS network data that provide reliable information that the mobile computing device is stationary within the cell site. The sensor data and non-GPS network data are converged when a plurality of corresponding scans produce overlapping results.

FIG. 1 illustrates a plurality of meaningful locations 100 of an exemplary user of a MCD. The plurality of meaningful locations 100 of a user of a MCD can include a home location 100, a work location 120, and a school location 125. Other possible locations are shown as well, for example library, parent's home, bookstore, church, soccer field, and a supplier's location. These locations are exemplary in nature and are not fully exhaustive. However, these locations make up a user's week in that they account for a percentage of the user's available time during week 130. A correlation of the time and frequency of where the user spends their time with the MCD in their possession can enable a determination of 'meaningful locations' for that user. These meaningful locations are also termed "preferred locations".

Figures 2, 3:
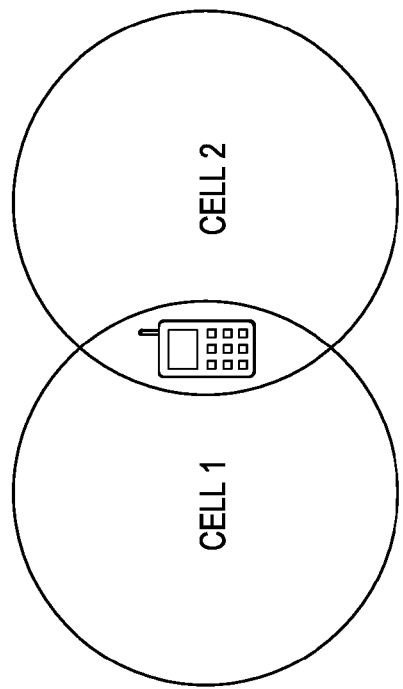
FIG. 2 illustrates a portion of an exemplary database.
FIG. 3 illustrates an exemplary mobile phone located between two overlapping cellular areas.

FIG. 2 illustrates data about multiple locations that can be analyzed to determine the MCD user's preference regarding the location. The data is shown to be categorized into activities, type of communication network, type of connected peripherals to the MCD, and who the MCD may be communicatively connected to. Specifically, the activities category can include time, transitions from one activity to another (e.g., switching from texting to gaming), application usage (e.g., barcode scanning, music playing, movie database lookup, gaming, sports video playing, etc.), call or short messaging service (e.g., dialer, text messaging, social networking, etc.).

The communication networks category can include type of communication network, cellular identification, signal quality, and received signal strength indicator, for example. The peripheral category can include wireless local area networks and wireless metro area networks based on IEEE 802.11 standards, including Wi-Fi, for example; Bluetooth, digital living network alliance (DLNA), docks, and chargers. The database may also categorize the name of businesses, who the MCD communicatively connected to, primary and secondary residences, workplaces, and commerce establishments that the MCD user often interacts with.

The database in FIG. 2 is an example and therefore can include either more or less data in different hierarchical or nonhierarchical structures. The database enables optimization of battery life for the MCD and optimized network usage. This is accomplished by relying on the captured demographic data within the database to predict movement of the MCD between preferred or meaningful locations. Additionally, the database may be a basis for predictions associated with Wi-Fi usage or battery charging, for example. Other innovative MCD features can be derived that may affect automation, discovery, and social aspects of the MCD.

FIG. 3 illustrates a situation when the MCD user is between two overlapping cellular areas (i.e., "cells"). The MCD may periodically or intermittently switch connectivity from one cellular tower to the other cellular tower even though the MCD is itself relatively stationary. This phenomenon is sometimes referred to as "cell bouncing", and has been shown to cause significant current drain upon the battery of the MCD, because several locations are attempting to be captured at once.

Figure 4:
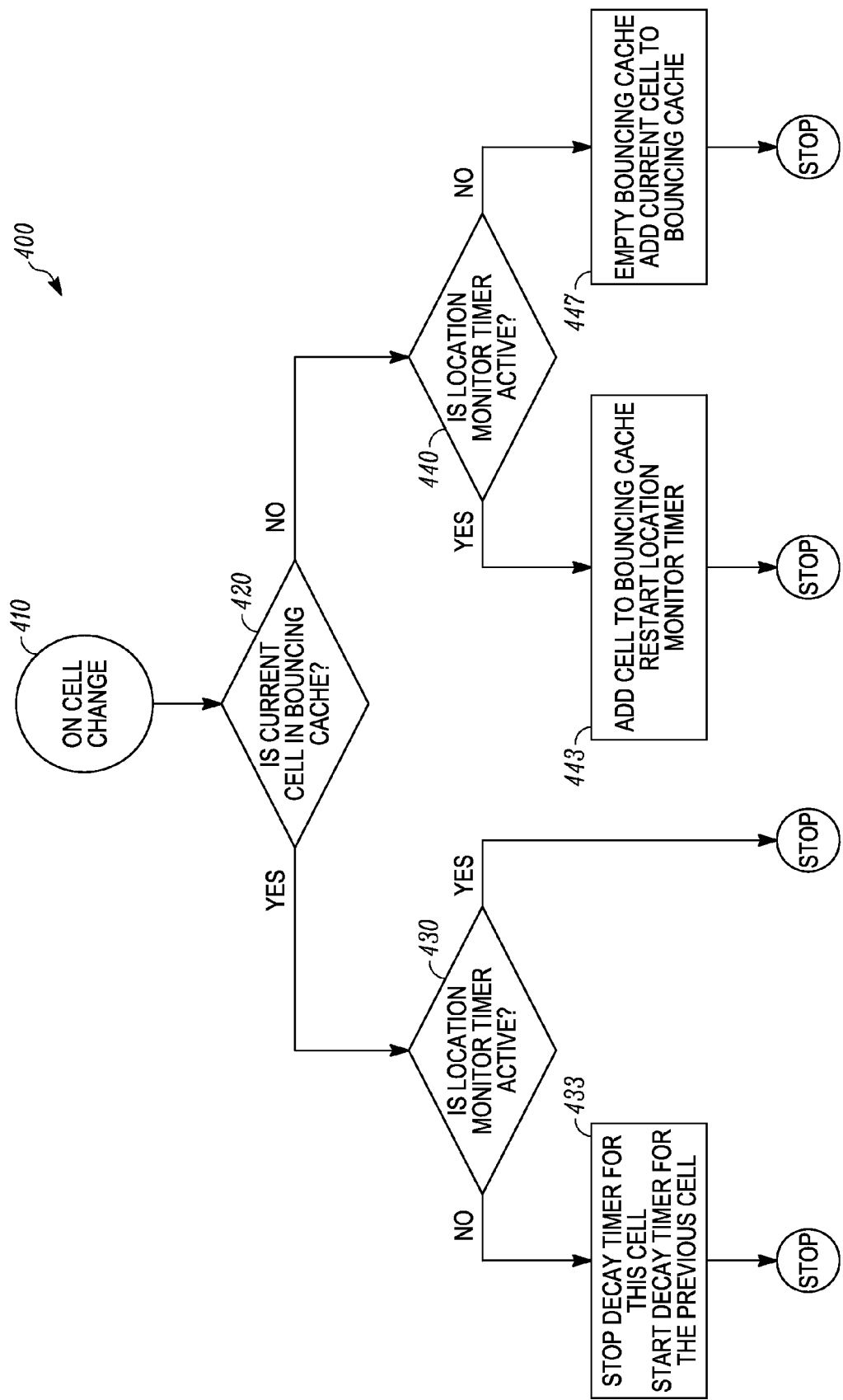
FIG. 4 illustrates an exemplary flowchart for handling the overlapping cellular condition of FIG. 3.

FIG. 4 illustrates a flowchart 400 that alleviates the "cell bouncing" phenomenon. Upon a cell change 410, an inquiry 420 determines whether the current cell connected to the MCD is in a bouncing cache. If the current cell connected to the MCD is in a bouncing cache, then a second inquiry 430 determines whether a location monitor timer is active. If the location monitor timer is not active, then in operation 433 a decay timer is stopped for the current cell and a decay timer is started for the previous cell. Otherwise, where a location monitor timer remains active all bouncing cache operations cease.

For inquiry 420, if the current cell connected to the MCD is not in a bouncing cache, a third inquiry 440 determines whether the location monitor timer is active. An affirmative answer to inquiry 440 leads to operation 443 that adds the current cell to a bouncing cache and restarts the location monitor timer. A bouncing cache herein includes the cache of cells that the user is frequently changing to due to radio frequency nature of mobile technology when the user is in areas shown in FIG. 3. These cell changes occur periodically even though the MCD is not moving and the "Bouncing Cache" includes the list of cells the MCD switches to without actually moving. A negative answer to inquiry 440 leads to operation 447 that empties the bouncing cache before adding the current cell to the now emptied bouncing cache. In short, when a location monitor timer expires, then a location is captured and decay timers are started for all cells except the current cell in the bouncing cache.

Figure 5:
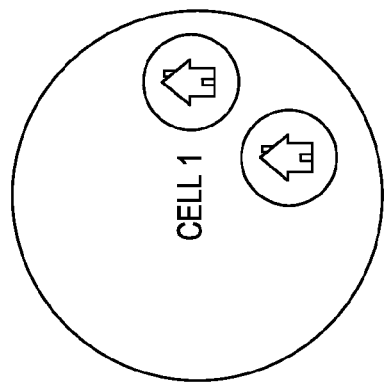
FIG. 5 illustrates the situation when WiFi is used as a Network Location provider.
Figure 6:
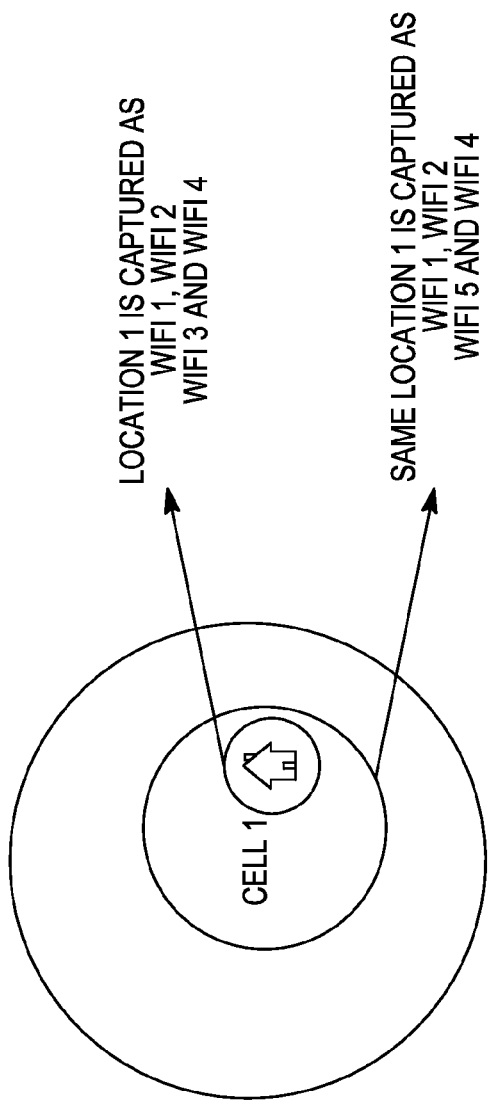
FIG. 6 illustrates the situation when the same location gets different sensorial data at different times.

FIG. 5 illustrates the situation when a MCD user is in a cellular area (herein referred to as "cell") and WiFi is used as a Network Location provider. If WiFi is turned off by the user, the location accuracy may not be perfect. Also, the accuracy provided by GPS may be greater, but GPS data is avoided in the present algorithm, because of its negative impact upon current usage. The novel solution described herein leverages when the user has connected the device to a charger. Thereafter, when the MCD is in charging mode, instructions are given to:

Turn on WiFi, if it is not turned ON
Turn on GPS, if it is not turned ON
Capture the location with the best possible accuracy FIG. 6 illustrates the situation when the same location gets different sensorial data at different times. For example, Location 1 sees Cell 1, Cell 2, via WiFi 1, WiFi 2 on Day 1. The same location sees Cell 1 & WiFi 1 only on day 2. Given the overlap of Cell 1 and WiFi 1 on both days, the locations are thereafter converged and treated as the same location as opposed to different locations. The WiFi points are used for the convergence.

Figure 7:
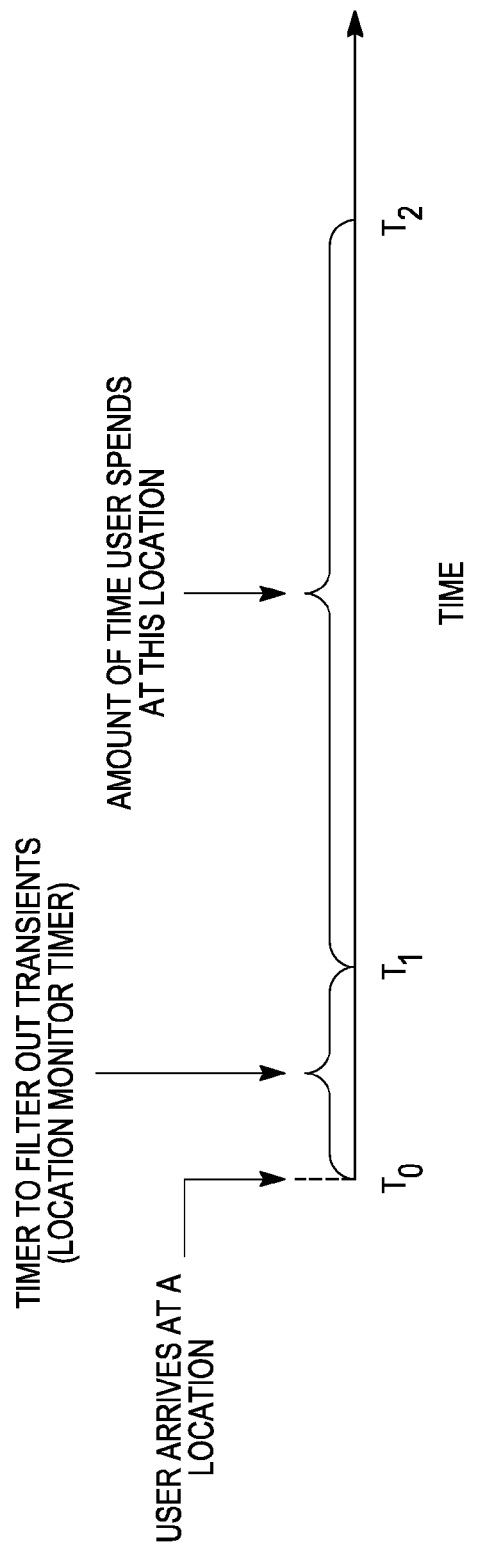
FIG. 7 illustrates an exemplary timing diagram.

FIG. 7 illustrates a timing diagram 700, wherein at $T_0$ the MCD user arrives at a location. From $T_1$-$T_0$ a location monitor timer filters out any transients. Whereas, between $T_2$-$T_1$, the amount of time a user spends at a particular location is derived.

It should be appreciated that a described process may include any number of additional or alternative tasks, the tasks shown in the figures need not be performed in the illustrated order, and a described process may be incorporated into a more comprehensive procedure or process having additional functionality not described in detail herein. Moreover, one or more of the tasks shown in a figure could be omitted from an embodiment of the respective process as long as the intended overall functionality remains intact. While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

It will be appreciated that some embodiments may be comprised of one or more generic or specialized processors (or "processing devices") such as microprocessors, digital signal processors, customized processors and field programmable gate arrays (FPGAs) and unique stored program instructions or code (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a non-transitory machine readable storage device or medium having computer readable code stored thereon for programming a computer (e.g., comprising a processor) to perform a method as described and claimed herein. Examples of such non-transitory machine readable storage devices or mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by a wireless device, comprising:
    determining that mobile communication device (MCD) is transmitting a cell site change;
    determining whether the MCD is currently in a cell site that has been placed in a bouncing cache;
    determining whether a location monitor timer is active, if the current cell site is not in the bouncing cache;
    adding the current cell site within the bouncing cache and restarting the location monitor timer, if the location monitor timer is active;
    emptying the bouncing cache and placing the current cell site within the bouncing cache, if the location monitor timer is inactive; and
    determining whether the MCD is stationary within a cell site based at least in part on whether the location monitor timer is active or inactive.

2. The method according to claim 1, wherein if the current cell site is determined to be within a bouncing cache:
    determining whether the location monitor timer is active; and stopping a decay timer for the current cell site if the location monitor timer is inactive.

3. The method according to claim 1, further comprising:
capturing location data; and
starting a decay timer for all received cell sites except the current cell site within the bouncing cache.

4. The method according to claim 3, further comprising:
removing the current cell site from the bouncing cache when a decay timer expires.

5. The method of claim 2, further comprising:
starting the decay timer for a previously found cell site if the location monitor timer is inactive.

6. The method according to claim 1, further comprising:
capturing a location including all the cell sites in the bouncing cache when the location monitor timer expires.

7. A method performed by a wireless device, comprising:
determining that a mobile communication device (MCD) is transmitting a cell site change;
determining whether the MCD is currently in a cell site that has been placed in a bouncing cache, wherein if the current cell site is determined to be within a bouncing cache:
  determining whether the location monitor timer is active; and
  stopping a decay timer for the current cell site if the location monitor timer is inactive;
determining whether a location monitor timer is active, if the current cell site is not in the bouncing cache;
adding the current cell site within the bouncing cache and restarting the location monitor timer, if the location monitor timer is active; and
emptying the bouncing cache and placing the current cell site within the bouncing cache, if the location monitor timer is inactive.

8. The method of claim 7, further comprising:
starting the decay timer for a previously found cell site if the location monitor timer is inactive.

9. The method according to claim 7, further comprising:
capturing a location including all the cell sites in the bouncing cache when the location monitor timer expires.

10. A method performed by a wireless device, comprising:
determining that a mobile communication device (MCD) is transmitting a cell site change;
determining whether the MCD is currently in a cell site that has been placed in a bouncing cache;
determining whether a location monitor timer is active, if the current cell site is not in the bouncing cache;
adding the current cell site within the bouncing cache and restarting the location monitor timer, if the location monitor timer is active;
emptying the bouncing cache and placing the current cell site within the bouncing cache, if the location monitor timer is inactive;
capturing location data; and
starting a decay timer for all received cell sites except the current cell site within the bouncing cache.

11. The method according to claim 10, further comprising:
removing the current cell site from the bouncing cache when a decay timer expires.

\* \* \* \* \*